July 7, 1925.  C. H. MELVIN  1,544,849
RAIL SPLICE
Filed April 14, 1923
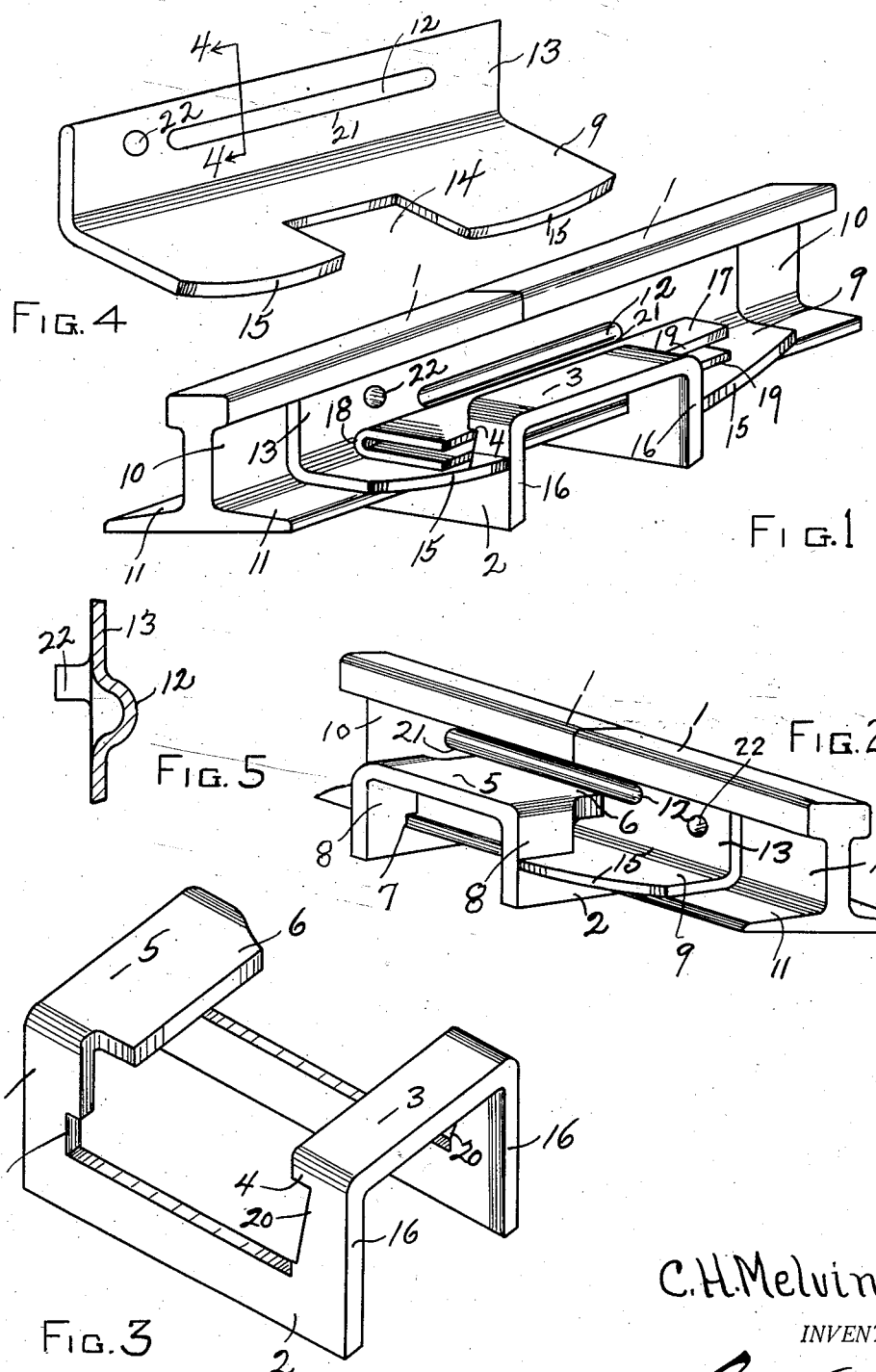
C. H. Melvin
INVENTOR.
BY Harpman
ATTORNEYS.

Patented July 7, 1925.

1,544,849

UNITED STATES PATENT OFFICE.

CHARLES H. MELVIN, OF YOUNGSTOWN, OHIO.

RAIL SPLICE.

Application filed April 14, 1923. Serial No. 632,026.

*To all whom it may concern:*

Be it known that I, CHARLES H. MELVIN, a citizen of the United States of America, residing at Youngstown, in the county of Mahoning and State of Ohio, have invented certain new and useful Improvements in Rail Splices, of which the following is a specification.

This invention relates to rail joints. The object of this invention is to provide improved means for joining the adjacent ends of railway rails, over that done by means of fish plates arranged on opposite sides of the rails at the joints and secured to the rails by means of bolts carrying nuts. Despite the fact that numerous substitutes for this kind have been suggested, it is so far as I am aware of, still the common custom to join rails by fish plates and bolts in the manner above described. Such joints are open to the objection that the nuts often work loose and much time is consumed in applying the nuts and bolts in the first instance, and in tightening them from time to time as they work loose.

The principal object of this invention is to provide a rail joint made by means of cutting and pressing steel to form the parts thereof.

Another object of this invention is to provide fish plates with horizontal ribs formed thereon for the purpose of forming a shoulder for an improved key and for forming a shoulder for contact with a gripping arm formed on the one end of an improved steel yoke. Also to provide a housing for a bonding wire for rails using electrical power.

A further object is to provide two fish plates having extended lugs for the purpose of securing the fish plates to the rails against undesirable horizontal movement.

A further object of the invention is to provide a tapering key formed of steel, one-half of the same being folded over against the other half, thereby forming an outer curved surface at the outer folded edge.

A still further object of this invention is to provide an improved pressed steel yoke for the holding of the fish plates securely against rails when properly keyed.

With these and other objects in view, the invention consists in the novel arrangement and construction of parts which will be hereinafter more fully described and claimed.

In the accompanying drawing:

Figure 1 is a perspective view showing the end and one side of the device.

Figure 2 is a perspective view showing an end and the other side of the device.

Figure 3 is a perspective view of the improved steel yoke.

Figure 4 is a perspective view of the fish plate.

Figure 5 is a sectional view taken on the line 4—4 of Figure 4.

By referring to Figure 1 it will be seen that I have provided a device for securing the ends of ordinary railway rails 1 so that the same may be held in proper relation to each other. In doing this, I have provided a yoke 2, provided with an upper portion 3, provided with a shoulder 4. The other end of the yoke 2 is provided with an upper portion 5, having an inwardly projecting arm 6 and notches 7 formed on the inner sides of the vertical arms 8.

By referring to Figure 1 it will be seen that the fish plate 9 fits up underneath the head of the rail 1 and snugly fits with the neck 10 of the rail 1 and the upper portion of the flanges 11 which form the base of the rail 1. This fish plate 9 is provided with a rib 12 formed longitudinally along the vertical portion 13 of the fish plate 9. This fish plate 9 is provided with a recess 14 for the purpose of allowing the fish plate 9 to be positioned within the yoke 2. The lower outer edge 15 of the fish plate 9 is provided with a curved surface in order to protect the yoke 2, should the car jump the track, and also for the purpose of giving support to the legs 16 which support the upper portion 3 of the yoke 2.

By referring to Figure 2 it will be seen that the upper portion 5 is provided with an inwardly projecting arm 6 which fits underneath the rib 12. The key 17 is now placed in position and driven home. The key is made by folding steel one half on the other half so as to form a curved edge 18 which fits underneath the rib 12. The opposite edges 19 of the key 17, function against the inner surface 20 of the legs 16. The key 17 is held in position by means of the shoulder 4 and the under edge 21 of the rib 12. In order that the fish plate may not have an undesirable horizontal movement, I have provided lugs 22 as shown in Figure 5 and which fit into suitable openings in the end of the rails 1. The lugs 22 above referred to are formed by means of pressing out a portion of the material, and which may be done in the same operation that forms the pressed rib 12.

Both fish plates 9 are alike. In assembling the device, the rails 1 are placed end to end. The fish plates 9, shown in Figure 2 is now placed in position. This placing of the fish plates 9, as shown in Figure 2, is accomplished by sliding the yoke 2 to the left, when the plate goes into position and the yoke is pushed back so that the fish plate takes the position, as shown in Figure 2. The fish plate, as shown in Figure 1 is now inserted. This can be accomplished by first placing the vertical portion 13 of the fish plates 9 against the neck 10 of the rail 1. The fish plate is now lowered into position which is made possible, due to the slot 14 which is formed in the fish plate 9 (see Figure 4). The key 17 is now slid into position and is driven in, in order to hold the fish plates 9 and the rail ends in a wedged position within the yoke 2.

What I claim is:

In a device of the class described, a pressed steel yoke, similar fish plates functioning within said yoke and against the neck of rail ends, a pressed lug formed in each of said fish plates, an upper portion of said yoke having an inwardly projecting gripping arm, a key formed by a single fold of flat steel so that one half falls upon the other half, a rounded outer edge of said key, a yoke with unlike ends for holding fish plates and key in a binding position about the ends of the rails, substantially as described for the purpose set forth.

In testimony whereof I affix my signature.

CHARLES H. MELVIN.

Witnesses:
C. A. HARPMAN,
L. A. OMLOR.